June 1, 1926.
A. B. SMITH
1,587,195
HEADLIGHT
Filed Oct. 6, 1925
2 Sheets-Sheet 1
Fig. 1.
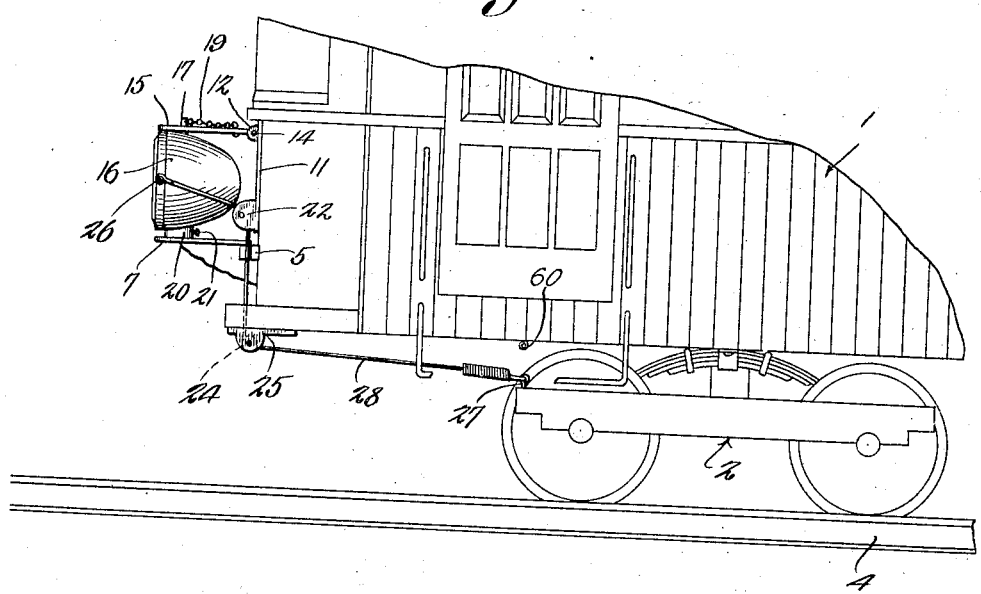
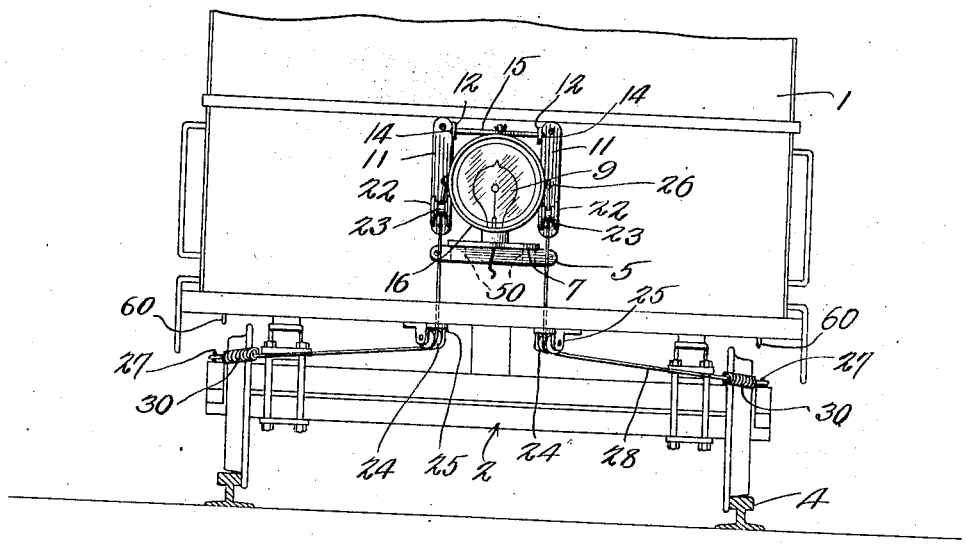
Fig. 2.
Inventor
A. B. Smith
By C. A. Snow & Co.
Attorneys June 1, 1926.
A. B. SMITH
HEADLIGHT
Filed Oct. 6, 1925
1,587,195
2 Sheets-Sheet 2
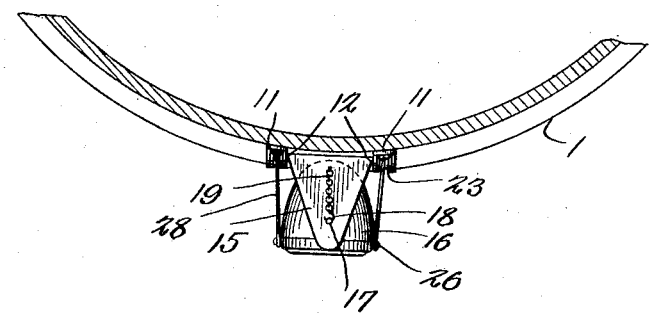
Fig. 3.
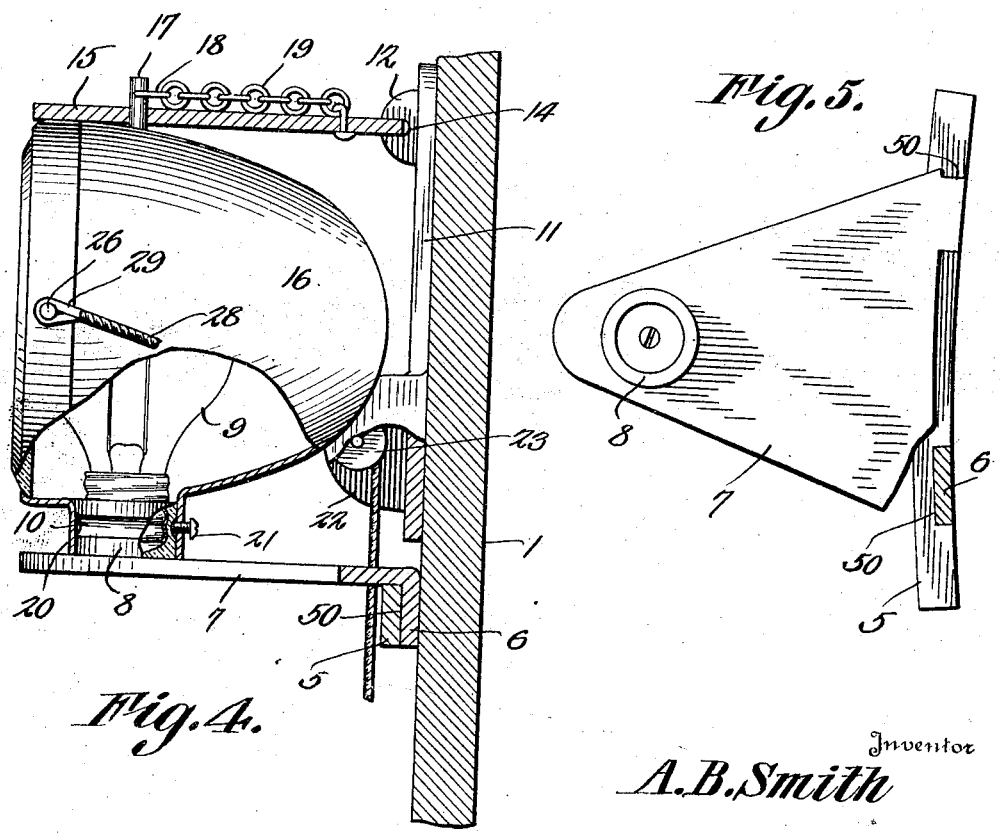
Fig. 4.
Fig. 5.
Inventor
A. B. Smith
By C. A. Snow & Co.
Attorneys.

Patented June 1, 1926.

1,587,195

UNITED STATES PATENT OFFICE.

ARTHUR B. SMITH, OF DENISON, TEXAS.

HEADLIGHT.

Application filed October 6, 1925. Serial No. 60,884.

This invention aims to provide novel means whereby, when a vehicle rounds a curve, a lamp on the vehicle may be caused to follow the curve.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 shows in side elevation, a portion of a vehicle whereunto the device forming the subject matter of this application has been applied; Figure 2 is a front elevation; Figure 3 is a horizontal section, parts appearing in top plan; Figure 4 is a vertical section; and Figure 5 is a fragmental horizontal section showing one of the last supports.

The device forming the subject matter of this application is adapted to be mounted on any sort of a vehicle, but, by way of illustration, merely, there is shown in the drawings, a car 1 having a truck 2 which is pivotally mounted, as usual, so that the wheels 3 of the truck may follow a track 4. A horizontal cleat 5 is secured to the front of the car and has recesses 50 adapted to receive, removably, vertical depending fingers 6 on the rear edge of a horizontal lamp support 7, in the form of a shelf. Near to its forward end, the support 7 carries an upstanding bearing 8 which serves, also, as a socket for the reception of a globe 9 forming part of the lamp on the car. The bearing 8 has an external circumferential groove 10.

Vertically disposed and horizontally spaced brackets 11 are secured to the front of the car 1 and are equipped adjacent to their upper ends with forwardly presented ears 12 wherein are mounted to rock, trunnions 14 on an upper support or wing 15, the wing or support 15 being adapted to be disposed parallel to the lower support 7, as shown in Figure 4 of the drawings.

The lamp includes a housing 16 wherein the globe 9 is located. On its upper side, the lamp housing 16 has a stub shaft 17 journaled in the upper support 15. In order to hold the lamp support or wing 15 from swinging upwardly, from the position shown in Figure 4, a hook 18 or the like is inserted through the upper end of the stub shaft 17, removably, above the wing 15, the hook or other securing element being connected with the wing by a flexible member 19, such as a chain. The lower portion of the housing 16 is supplied with a depending collar 20 journaled on the bearing 8. A screw 21 is threaded into the collar 20 and is received at its inner end in the circumferential groove 10 of the bearing 8 to connect the collar 20 with the bearing in such a way that the housing 16 can be swung from side to side—although if it is desired to hold the housing 16 in a fixed position, the screw 21 can be threaded inwardly until it bears against the bearing 8 on the lower support 7. Adjacent to their lower ends, the brackets 11 have forwardly presented ears 22 whereon pulleys 23 are journaled. Pulleys 24 are journaled on brackets 25 secured beneath the car 1 at the forward end thereof. At its sides, the housing 16 has projections 26. Eyes 27 or the like are mounted on the truck 2 near to the forward end thereof. Flexible elements 28 are provided and are equipped at their forward ends with hooks 29 or the like, adapted to engage the projections 26 on the sides of the lamp housing 16. From the projections 26, the flexible elements 28 are led rearwardly and downwardly about the pulleys 23 and, thence, are carried rearwardly about the pulleys 24, the rear ends of the flexible elements being connected to retractile springs 30, which in their turn, are connected at their rear ends to the eyes 27 on the truck 2.

So far as the general operation of the device is concerned, it will be understood readily, after a glance at the drawings, that as the truck 2 follows the curve in the track 4, the flexible elements 28 will swing the lamp housing 16, so as to direct the light around the curve.

When the occasion for the use of the device has passed, the flexible elements 28 may be detached from the eyes 27 on the truck 2 and may be connected to eyes 60 on the underside of the car 1 above the forward end of the truck 2, the lamp housing being left in place, and being rendered stationary by means of the screw 21. If preferred, the flexible elements 28 may be detached at 26—29 from the lamp housing 16, and the forward ends of the flexible elements 28 may be engaged about the body portions of the flexible elements 28, below the pulleys 23, near the lower ends of the brackets 11, the flexible elements 28 remaining assembled with the truck 2, as shown in Figure 1. It is obvious, that, if desired, the two operations last-above described may be combined, the flexible elements being detached both from the truck 2 and from the lamp housings.

The hook 18 is detached from the shaft 17 of the lamp housing 16, and the support 15 is swung upwardly, off the shaft 17 of the lamp housing 16. The lower support 7 may be removed, carrying with it the lamp housing 16, the fingers 6 being withdrawn from behind the cleat 5. The upper support or wing 15 finally may be swung down into a vertical position, and, when the device is not in use, there will be practically nothing projecting forwardly from the car.

Having thus described the invention, what is claimed is:—

1. In a device of the class described, a vehicle, a lower support detachably mounted on the vehicle, an upper support mounted for vertical swinging movement on the vehicle, a lamp journaled on the supports, and means for imparting swinging movement to the lamp when the vehicle rounds a curve.

2. In a device of the class described, a vehicle, a rigid lower support having a depending finger, means on the vehicle for receiving the finger, an upper support, means for mounting the upper support on the vehicle for vertical swinging movement, a lamp mounted to swing on the supports, and means for imparting swinging movement to the lamp as the vehicle rounds a curve.

3. In a device of the class described, a vehicle, a rigid lower support on the vehicle and provided with a bearing, a light carried by the bearing, a housing for the light, the housing being mounted to turn on the bearing, an upper support mounted for swinging movement, the housing being mounted to rock on the last-specified support, and means for imparting swinging movement to the housing as the vehicle rounds a curve.

4. In a device of the class described, a vehicle, a lamp, means for mounting the lower portion of the lamp on the vehicle for swinging movement, an upper support hinged to the vehicle for vertical swinging movement into and out of engagement with the lamp, and forming a bearing for the lamp, and means for imparting swinging movement to the lamp as the vehicle rounds a curve.

In testimony that I claim the foregoing as my own, I have hereto affixed my signature.

ARTHUR B. SMITH.